Aug. 11, 1931.  W. G. MAYER  1,818,415
TRUCK BODY VENTILATOR
Filed July 13, 1928
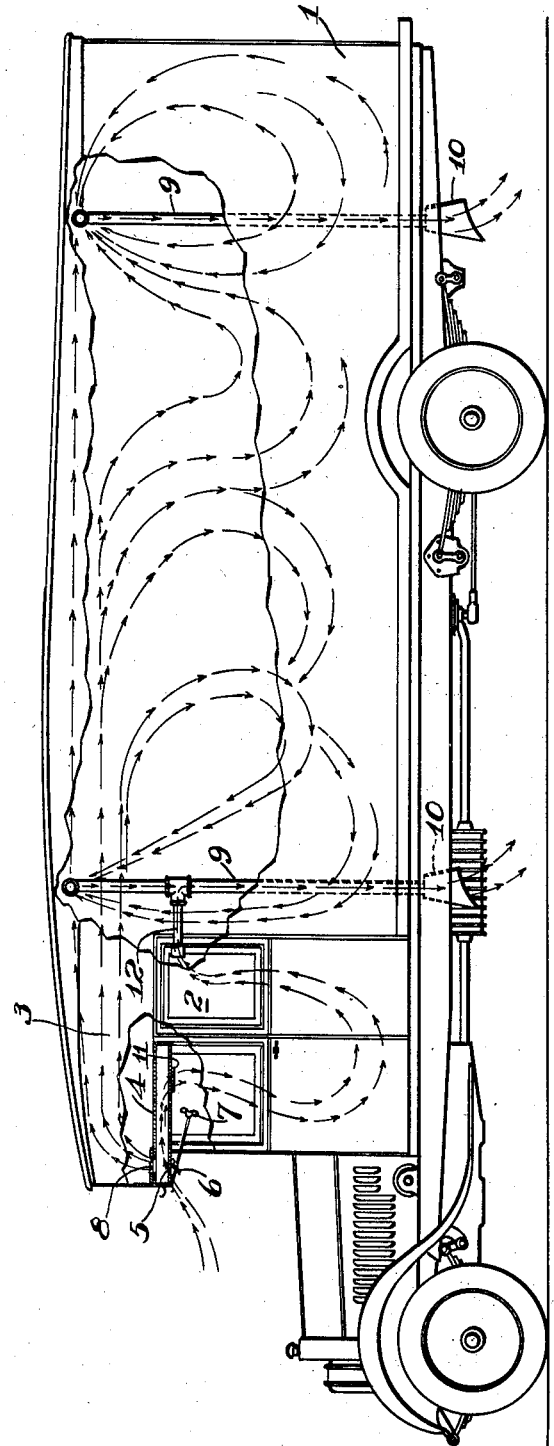
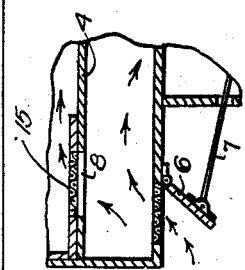
William G. Mayer
INVENTOR Patented Aug. 11, 1931

1,818,415

UNITED STATES PATENT OFFICE

WILLIAM G MAYER, OF PITTSBURGH, PENNSYLVANIA

TRUCK BODY VENTILATOR

Application filed July 13, 1928. Serial No. 292,472.

The invention relates to the ventilation of closed compartments of automotive vehicles, and especially to the ventilation of enclosed automobile trucks or vans.

An object of the invention is to provide means effective during motion of an automotive vehicle for obtaining a positive draft through closed compartments thereof.

Another object is to provide means combined with an automotive vehicle for applying the movement of air past the vehicle when in motion to effectively ventilate closed compartments thereof.

It is also among the objects of the invention to provide means of the type referred to which are simple in construction and operation, inexpensive, readily installed in existing vehicles or in those under construction, and which provide adjustably variable, efficient introduction, circulation and withdrawal of air from closed compartments of automotive vehicles.

The advent of better roads and improved automobile construction have combined to make commercial transportation in that manner of increasingly great importance. Especially is this true in the case of furniture and household effects. Large numbers of closed automobile trucks or vans are now employed in hauling such articles over great distances, in preference to transportation by rail, and the number of trucks used for this purpose, and consequently the amount of goods thus moved, grows substantially each year.

These trucks must, for economic reasons, be packed to full capacity, and the necessary stacking and close fitting results in a considerable load being placed on some articles. Mats made from coarse fabrics are placed between the articles. These vans must also be tightly closed to prevent damage to the load by rain or snow, or by dust. It is well known that a closed, unventilated space of this type becomes very hot when the container thereof is exposed to the sun; and they also are heated from the end and underneath by the motor and exhaust. This heating causes the varnish or finish of many articles of furniture to soften to a point where the pressure of other goods forces the mats into the finish. The damage thus caused is frequently serious.

This spoiling of furniture has presented a problem to those engaged in the automobile transportation business, because of the damage claims resulting, and because many people who would otherwise ship in this manner are for this reason deterred from doing so. The problem presented has been fully recognized, and attempts have been made to devise means of maintaining the truck bodies cool enough to prevent this damage. But so far as I am aware, such means have not secured effective ventilation and at the same time excluded dirt, dust, and rain.

Similar problems arise in transporting perishable materials. For example, in the baking industry, where bread is packed and shipped while very fresh, it is absolutely essential to its quality that it shall not "sweat". If heated in a closed space the frosting of cakes melts, etc. Such products ever more than furniture must be protected from dirt, rain, etc.

The present invention provides simple, effective means for overcoming the foregoing and allied disadvantages which attend the use of closed compartment automotive vehicles.

The invention is applicable to all types of automotive vehicles provided with closed compartments, but its use is particularly advantageous in connection with trucks or vans. In the accompanying drawings Fig. 1 illustrates a side view of a truck, part of the side wall being broken away, equipped with the preferred embodiment of the invention; and Fig. 2 is an enlarged fragmentary view of the intake duct shown in Fig. 1.

Referring to the drawings, there is conventionally represented an automobile truck provided with a closed load-receiving body portion 1, and a closed cab 2. The body shown is of a type commonly used, having a forward overhanging bulkhead 3, for receiving small articles, pictures, etc. Disposed between the bottom of the bulkhead and the top of the cab is an air intake conduit or duct 4, preferably comprising a broad, flat, box-like metal structure, having a port 5, open to the atmosphere forwardly of the windshield. A shutter 6, operated by a handle 7 disposed in the cab, permits adjustment of the opening to control the amount of air admitted to the duct. An opening 8, or series of openings, in the upper wall of duct 4, connects it with the bulkhead and the inside of the body. A filter screen 15, Fig. 2, to remove dust and the like, may be disposed in either of these openings. Care is, of course, taken not to use a screen so fine as to offer too much resistance to the air.

The exhausting means comprises one or more conduits, depending upon the size of the body, disposed within the body and leading to the atmosphere. These preferably comprise pipes 9, disposed against the walls of the body, and suitably spaced. They also preferably extend through the bottom, although they may pass to the sides or top, provided precaution against the entrance of rain or snow is taken. The outer ends of these conduits are provided with means for creating a suction therein by the flow of air therepast when the vehicle is in motion. This means may assume a variety of forms, but for ease and simplicity of construction and because of the low cost, the type shown is preferred. This comprises cowled or obliquely truncate funnels 10, attached at their smaller ends to the ends of pipes 9, the oblique, or open face being faced to the rear of the vehicle.

When the vehicle is in motion, air enters duct 4 through opening 5, passes through opening 8 to the bulkhead and thence to the body. The air, because of the pressure, is forced to circulate, and the articles loaded in the body act as baffles, causing it to follow a tortuous path, schematically indicated by the arrowed lines. At the same time, the difference in pressure between the outside of conduits 9, and the inside, created by the rush of air past the funnels, sets up a draft which pulls the air from the body, and continuously withdraws it. In this manner, air is forced to circulate around the articles comprising the load, and the temperature is kept below that at which damage may occur. The draft will vary with the speed of the vehicle, but since this type of vehicle usually moves at relatively high speeds, the temperature will normally be below the danger point.

These vehicles usually travel day and night, and at times it may not be desirable to open the cab windows. When several men are in the cab the air may become stuffy. A further feature of the invention is the provision of means for applying it to ventilation of the cab. To this end, an opening 11 is provided in the duct 4, which permits air to enter the cab, and a connection 12 is made to one or more of the conduits 9. This results in forced ventilation similar to that produced in the body. The opening 11 may be provided with a shutter if desired.

Truck body designs vary greatly and some have the bulkhead shown, and others not. It will be understood that the invention is fully applicable to all types of vehicle, and that the construction and disposition of the intake duct and its openings may be varied. For example, in a truck not having a bulkhead, the duct may be disposed in the upper side of the cab, and the opening 8 to the body placed at its rear, to open directly into the body. All such changes and modifications necessary to adapt the invention to different body designs are fully within the ability of artisans and require no extended description or illustration.

The invention provides means which depend only upon the motion of the vehicle to render them effective, to force air into a closed compartment, and to create a suction for positively withdrawing the air after circulation. The means provided by the invention is of simple construction, is cheap and readily installed. It does not add any appreciable weight, occupies very little space, and is effective as soon as the vehicle begins to move.

I claim as my invention:

1. The combination with an automotive vehicle provided with separate closed body and cab compartments, of a conduit disposed forwardly of said body for introducing air into said compartments, an exhaust conduit disposed within and leading from said body compartment and provided at its outer end with an exhaust funnel member turned rearwardly of the vehicle, and connections between said cab and said exhaust conduit, whereby motion of the vehicle causes positive introduction and circulation of fresh air in said compartments.

2. The combination with an automobile truck having a closed load-receiving body, of means operative upon forward motion of the truck for circulating air in said body, said means comprising a longitudinal air intake duct at the forward end opening into said body and provided at its extended end with an opening to the atmosphere, means for adjustably controlling the amount of air admitted to said duct, a plurality of exhaust conduits vertically disposed at spaced intervals within said body and leading to the atmosphere, and cowled funnels connected at their small ends to the outer ends of said exhaust conduits and having their obliquely open face normally disposed rearwardly, whereby to create a positive draft within the body by the flow of air past said funnels when the truck is in motion.

3. The combination set forth in claim 6, and dust-removing screens disposed in the air intake conduit at a point forward of its opening into the body.

4. The combination with an automobile truck having separate closed cab and load-receiving body compartments, of means operative by motion of the truck for ventilating said cab and body to cool the load, said means including an air intake duct disposed above said cab and provided with an opening to the atmosphere at the front of the truck and openings to said cab and body, a shutter for adjustably controlling the opening to the atmosphere, a plurality of exhaust conduits disposed vertically along the side walls of said body and leading beneath the truck, draft-creating hoods on the outer ends of said conduits, and connections between said cab and one of said conduits, whereby the rush of air during motion of the truck causes air to enter said duct and creates a suction in said conduits, to positively and continuously circulate air through the cab and body while the truck is in motion.

In testimony whereof, I sign my name.

WILLIAM G. MAYER.